H. A. Chapin.
Tapping Gas Fittings.
Nº 15,219.  Patented Jul. 1, 1856.
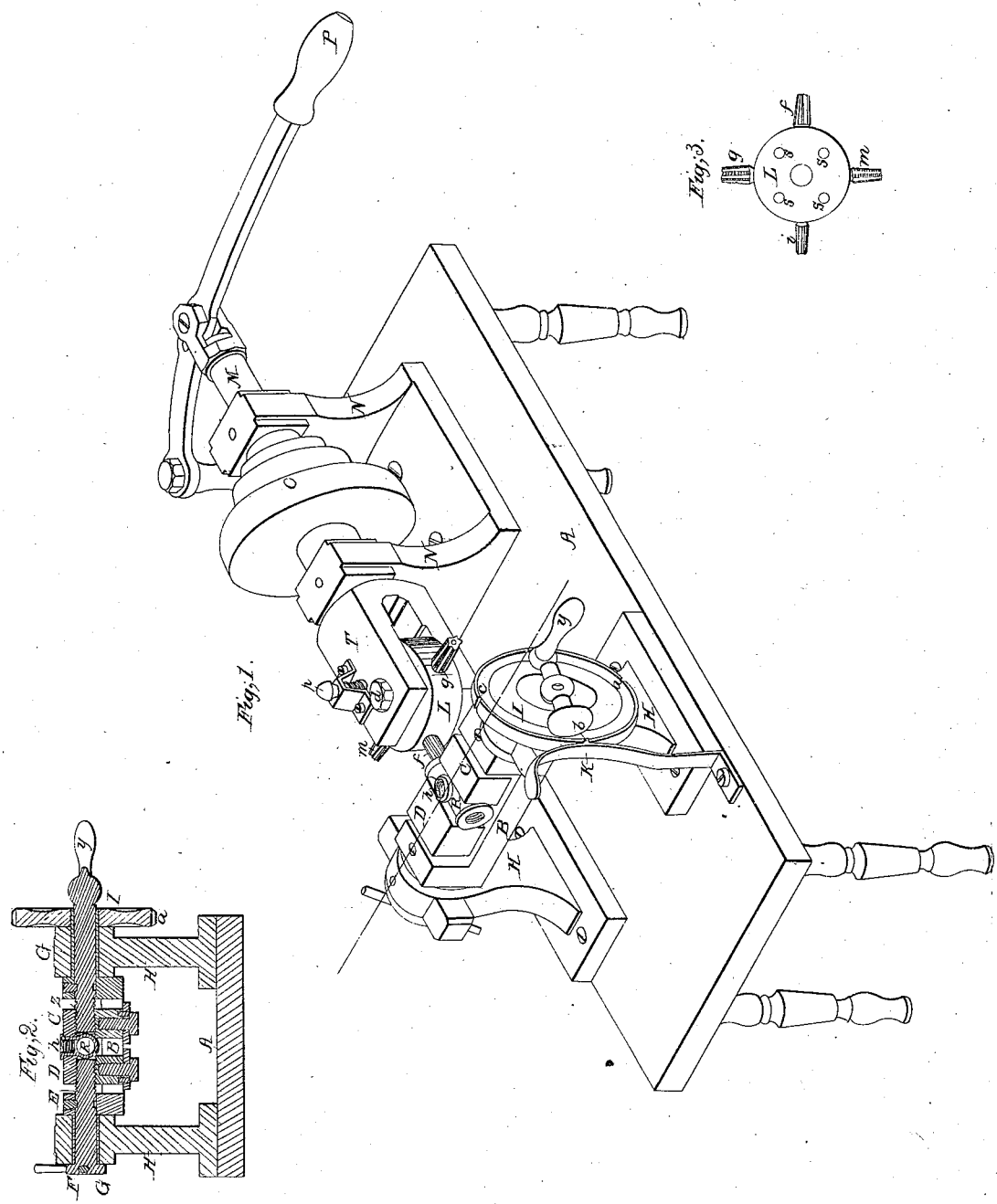

UNITED STATES PATENT OFFICE.

HENRY A. CHAPIN, OF SPRINGFIELD, MASSACHUSETTS.

MACHINE FOR REAMING AND TAPPING GAS-FITTINGS.

Specification forming part of Letters Patent No. 15,219, dated July 1, 1856; Reissued December 23, 1856, No. 419.

*To all whom it may concern:*

Be it known that I, HENRY A. CHAPIN, of Springfield, in the county of Hampden and State of Massachusetts, have invented an Improved Machine or Composite Tool for Rimming Out and Tapping Gas and Steam Fittings, of which the following is a full, clear, and exact description, reference being had to the annexed drawings, making part of this specification, in which—

Figure 1, is a perspective view of my machine in operation; Fig. 2, a vertical section through the clamp which holds the fitting; Fig. 3, a view of the tap holder, which will be more particularly referred to hereafter.

My invention consists in the employment of a peculiarly constructed holder for carrying the necessary tapping and rimming tools, in combination with a rotary chuck or clamp, for holding the fittings, the whole being so arranged that the various rimming tools and taps may be brought to bear in succession as required upon the fittings, without removing either the tools or the taps from the lathe, as will be hereinafter more fully explained.

In the accompanying drawings, A, is the bed of the machine, to which the operating parts are secured. The clamp B, is provided with movable jaws C, and D, the latter is adjusted by the hand wheel F, and screw E, so as to bring the center of the fitting into the proper position, and the jaw C, is moved as required to and from the other by the handle $y$, upon the screw $z$. The shaft G, of the clamp turns in standards H, and carries upon one end the wheel I, into the notches $a$, $b$, $c$, of which the spring bolt, K, enters, by which means the clamp may be secured in the required position.

The cutter holder L, may be turned upon its axis $d$, within the forked end T of the shaft M, which revolves in the standards N, and is driven by power applied to the pulleys O, connected with the shaft by a spline, the band which actuates the pulleys, being so arranged that the direction of its motion may be instantly reversed by means of an ordinary shipper lever, or otherwise. The shaft M, slides freely in its boxes and is brought up to its work by the hand lever P. The spring bolt $p$ enters the holes $s$ in the holder L, by which means the latter is held clamped to its forked carrier T, while in operation.

Operation: The axes of the shafts G, and M, being arranged at the same height above the table A, the jaw D, is adjusted so as to bring the center of the fitting R, within the axis of the shaft M, and the fitting is clamped as seen in the drawings, by bringing up the jaw C. When once adjusted, the jaw D, does not require to be changed until a fitting of a different size is to be operated upon. The fitting being clamped in the position shown in Fig. 1, the holder L, is turned so as to bring the large rimmer $f$, in line with the center of the fitting; the shaft M, is then made to revolve and the rimmer is brought up to its work by the hand lever P, after the opening in the fitting is suitably enlarged, the holder is revolved and the large tap $g$, is brought up, by which one of the female screws in the "run" is formed. The tap is then withdrawn and the fitting is revolved 180° so as to bring its opposite end into position to be operated upon by the same tools. The fitting is then turned so as to bring the "outlet" $h$, opposite to the tool holder, and the smaller rimmer $i$, is brought up, then the corresponding tap $m$, and the three screws are completed.

By the use of this machine a much larger amount of work may be accomplished than has been found practicable by the means heretofore employed for the purpose, while the work is done with an accuracy entirely unattainable by the hand process.

What I claim as my invention and desire to secure by Letters Patent, is—

The rotating tool holder, as constructed and operated, in combination with the revolving chuck or clamp for holding the fitting, the whole being arranged in the manner substantially as herein set forth for the purpose described.

HENRY A. CHAPIN.

Witnesses:
   GEO. DWIGHT,
   SIMON BROOKS.

[FIRST PRINTED 1912.]